(12) United States Patent
Huscroft

(10) Patent No.: US 6,490,317 B1
(45) Date of Patent: Dec. 3, 2002

(54) DATA, PATH AND FLOW INTEGRITY MONITOR

(75) Inventor: Charles Kevin Huscroft, Port Moody (CA)

(73) Assignee: PMC-Sierra, Inc. (CA)

( * ) Notice: Subject to any disclaimer, the term of this patent is extended or adjusted under 35 U.S.C. 154(b) by 0 days.

(21) Appl. No.: 09/374,995

(22) Filed: Aug. 16, 1999

Related U.S. Application Data

(63) Continuation-in-part of application No. 08/575,153, filed on Dec. 19, 1995.

(51) Int. Cl.[7] .................................................. H04B 3/46

(52) U.S. Cl. ...................... 375/224; 370/248; 370/251; 714/728; 714/739

(58) Field of Search ................................. 375/130, 224, 375/227, 228; 370/247, 248, 250, 251, 252; 714/728, 739

(56) References Cited

U.S. PATENT DOCUMENTS

| 4,817,148 | A | | 3/1989 | Lafferty et al. | |
|---|---|---|---|---|---|
| 5,029,166 | A | | 7/1991 | Jarwala et al. | |
| 5,355,379 | A | * | 10/1994 | Hobson et al. | ............. 714/747 |
| 5,428,607 | A | | 6/1995 | Hiller et al. | |
| 5,500,851 | A | | 3/1996 | Kozaki et al. | |
| 5,515,383 | A | * | 5/1996 | Katoozi | ...................... 714/732 |
| 5,526,389 | A | | 6/1996 | Buell et al. | |
| 5,574,733 | A | | 11/1996 | Kim | |

* cited by examiner

Primary Examiner—Don N. Vo
(74) Attorney, Agent, or Firm—Hall, Priddy, Myers & Vande Sande

(57) ABSTRACT

A method of monitoring the integrity of the path and flow of digital PCM data from a source end to a receiving end which includes generating a pseudo-random sequence of bits at the source end, transmitting the pseudo-random sequence of bits together with the PCM data through a transmission path to a receiving end, and applying the pseudo-random sequence of bits to a pseudo-random bit sequence checker at the receiving end.

25 Claims, 6 Drawing Sheets

| Clock | Stage 1 | Stage 2 | Stage 3 | Stage 4 | Stage 5 | Stage 6 | Stage 7 |
|---|---|---|---|---|---|---|---|
| 1 | 1 | 1 | 1 | 1 | 1 | 1 | 0 |
| 2 | 0 | 1 | 1 | 1 | 1 | 1 | 1 |
| 3 | 0 | 0 | 1 | 1 | 1 | 1 | 1 |
| 4 | 0 | 0 | 0 | 1 | 1 | 1 | 1 |
| 5 | 0 | 0 | 0 | 0 | 1 | 1 | 1 |
| 6 | 0 | 0 | 0 | 0 | 0 | 1 | 1 |
| 7 | 1 | 0 | 0 | 0 | 0 | 0 | 1 |
| 8 | 0 | 1 | 0 | 0 | 0 | 0 | 0 |
| 9 | 0 | 0 | 1 | 0 | 0 | 0 | 0 |
| 10 | 0 | 0 | 0 | 1 | 0 | 0 | 0 |
| 11 | 0 | 0 | 0 | 0 | 1 | 0 | 0 |
| 12 | 1 | 0 | 0 | 0 | 0 | 1 | 0 |
| 13 | 1 | 1 | 0 | 0 | 0 | 0 | 1 |
| 14 | 0 | 1 | 1 | 0 | 0 | 0 | 0 |
| 15 | 0 | 0 | 1 | 1 | 0 | 0 | 0 |
| 16 | 0 | 0 | 0 | 1 | 1 | 0 | 0 |
| 17 | 1 | 0 | 0 | 0 | 1 | 1 | 0 |
| 18 | 0 | 1 | 0 | 0 | 0 | 1 | 1 |
| 19 | 1 | 0 | 1 | 0 | 0 | 0 | 1 |
| 20 | 0 | 1 | 0 | 1 | 0 | 0 | 0 |
| 21 | 0 | 0 | 1 | 0 | 1 | 0 | 0 |
| 22 | 1 | 0 | 0 | 1 | 0 | 1 | 0 |
| 23 | 1 | 1 | 0 | 0 | 1 | 0 | 1 |
| 24 | 1 | 1 | 1 | 0 | 0 | 1 | 0 |
| 25 | 1 | 1 | 1 | 1 | 0 | 0 | 1 |
| 26 | 0 | 1 | 1 | 1 | 1 | 0 | 0 |
| 27 | 1 | 0 | 1 | 1 | 1 | 1 | 0 |
| 28 | 0 | 1 | 0 | 1 | 1 | 1 | 1 |
| 29 | 0 | 0 | 1 | 0 | 1 | 1 | 1 |
| 30 | 0 | 0 | 0 | 1 | 0 | 1 | 1 |
| 31 | 1 | 0 | 0 | 0 | 1 | 0 | 1 |
| 32 | 1 | 1 | 0 | 0 | 0 | 1 | 0 |

FIGURE 7

| =Clock | Stage 1 | Stage 2 | Stage 3 | Stage 4 | Stage 5 | Stage 6 | Stage 7 | line 158 | ERR |
|---|---|---|---|---|---|---|---|---|---|
| 1 | 0 | | | | | | | | |
| 2 | 1 | 0 | | | | | | | |
| 3 | 1 | 1 | 0 | | | | | | |
| 4 | 1 | 1 | 1 | 0 | | | | | |
| 5 | 1 | 1 | 1 | 1 | 0 | | | | |
| 6 | 1 | 1 | 1 | 1 | 1 | 0 | | | |
| 7 | 1 | 1 | 1 | 1 | 1 | 1 | 0 | | |
| 8 | 0 | 1 | 1 | 1 | 1 | 1 | 1 | 1 | 0 |
| 9 | 0 | 0 | 1 | 1 | 1 | 1 | 1 | 0 | 0 |
| 10 | 0 | 0 | 0 | 1 | 1 | 1 | 1 | 0 | 0 |
| 11 | 0 | 0 | 0 | 1 | 1 | 1 | 1 | 0 | 0 |
| 12 | 0 | 0 | 0 | 0 | 1 | 1 | 1 | 0 | 0 |
| 13 | 1 | 0 | 0 | 0 | 0 | 1 | 1 | 0 | 0 |
| 14 | 0 | 1 | 0 | 0 | 0 | 0 | 1 | 1 | 0 |
| 15 | 0 | 0 | 1 | 0 | 0 | 0 | 0 | 0 | 0 |
| 16 | 0 | 0 | 0 | 1 | 0 | 0 | 0 | 0 | 0 |
| 17 | 0 | 0 | 0 | 0 | 1 | 0 | 0 | 0 | 0 |
| 18 | 1 | 0 | 0 | 0 | 0 | 1 | 0 | 0 | 0 |
| 19 | 1 | 1 | 0 | 0 | 0 | 0 | 1 | 1 | 0 |
| 20 | 0 | 1 | 1 | 0 | 0 | 0 | 1 | 1 | 0 |
| 21 | 0 | 0 | 1 | 1 | 0 | 0 | 0 | 0 | 0 |
| 22 | 0 | 0 | 0 | 1 | 1 | 0 | 0 | 0 | 0 |
| 23 | 1 | 0 | 0 | 0 | 1 | 1 | 0 | 0 | 0 |
| 24 | 0 | 1 | 0 | 0 | 0 | 1 | 1 | 1 | 0 |
| 25 | 1 | 0 | 1 | 0 | 0 | 1 | 1 | 0 | 0 |
| 26 | 0 | 1 | 0 | 1 | 0 | 0 | 1 | 1 | 0 |
| 27 | 0 | 0 | 1 | 0 | 1 | 0 | 0 | 0 | 0 |
| 28 | 1 | 0 | 0 | 1 | 0 | 1 | 0 | 0 | 0 |
| 29 | 1 | 1 | 0 | 0 | 1 | 0 | 1 | 1 | 0 |
| 30 | 1 | 1 | 1 | 0 | 0 | 1 | 0 | 1 | 0 |
| 31 | 1 | 1 | 1 | 1 | 0 | 0 | 1 | 1 | 0 |
| 32 | 0 | 1 | 1 | 1 | 1 | 0 | 0 | 0 | 0 |

FIGURE 8

DATA, PATH AND FLOW INTEGRITY MONITOR

RELATED APPLICATION

This application is a continuation-in-part of U.S. patent application Ser. No. 08/575,153 filed Dec. 19, 1995, the contents of which is incorporated herein by reference.

FIELD

The present invention relates to an apparatus and method for monitoring the integrity of data, path and flow for digital pulse code modulated (PCM) switching systems to ensure correct operation.

BACKGROUND

In large digital PCM switching systems, one must monitor the switching system to ensure that it is operating correctly. Because of the large number of PCM channels that may be routed by a relatively small amount of circuitry, the core of the switching system is typically duplicated to provide redundancy so as to increase the availability of the system. Typically, two planes of switching circuitry operate simultaneously, with one plane acting as a hot standby for the other. PCM data from each source is routed to both switching planes and at each destination, circuitry selects PCM data from one of the switching planes, falling back to the other switching plane if required. In order to benefit from this redundancy, one must be able to detect a failure in the active switching plane and quickly switch over to the still functional switching plane while the failed switching plane is taken out of service so that failed circuits can be identified and replaced without affecting service (provided that another fault does not occur in the still functional switching plane while it is operating without a backup). Thus, rapid detection and diagnosis of a fault is required to minimize "downtime" of the PCM switching capability.

In typical PCM switching systems, data to be routed through the switch consists of an 8-bit PCM sample. Such samples are normally presented to the switching system at an 8 kHz rate, and are often grouped into time division multiplexed (TDM) frames carrying multiple PCM sample streams, where the frame repetition rate is 8 kHz. In many cases a lower bit rate channel is routed together with the PCM sample in order to carry signalling information. Modern systems usually allow for four state signalling and, thus require 4 bits to encode the signalling state. With frames being transmitted at 8 kHz there is a 125 microsecond interval between one frame and the next. With a requirement that PCM data be transmitted at a 64 kbit/s rate, this requires transmission of.8 bits every 125 microseconds or, in other words, one 8 bit word every frame. The requirement for signalling throughput is only 1.333 kbit/s in North America and 2 kbit/s in Europe and elsewhere. This means that transmitting only 1 bit per frame of signalling data would be more than adequate. Both requirements could be met by transmitting a 9-bit word every frame with one bit being of signalling data and the other 8 bits being PCM data. In fact, only 4 bits need be sent every 16 to 24 frames (referred to as a multi-frame).

When sending data through a switch core three types of checks are required, namely, a data integrity check, a path integrity check, and a flow integrity check. A data integrity check determines if the data was altered as it passes through the switch core. This is typically accomplished by adding a parity bit to the word of PCM data that is routed through the switch core. Generation and checking of parity is extremely simple. However, a parity bit does not permit path or flow integrity checking.

It is possible for a data path to become altered on occasion and for a given destination to be receiving data from the wrong source. Consequently, it is desirable to do a regular path integrity check. Many switch cores do not incorporate such a check. Those that do, often accomplish such a check by adding an extra bit to the word of PCM data that is routed through the switch core to implement a data link. By exchanging messages through this data link, connectivity can be regularly checked. The problem with this approach is that the circuitry to exchange such messages may be quite complex and slow to detect a path integrity failure.

A flow integrity check determines if data continues to flow via the switch core path. Many switch cores do not incorporate such a check. Those that do often accomplish a flow integrity check by adding an extra bit to the word of PCM data that is routed through the switch core. Such an extra bit implements a data link as for the extra bit for the path integrity check discussed above by which messages may be exchanged and flow integrity monitored. Typically, this is accomplished using the same bit as used for the data link. The problem with this approach, as for the path integrity check using an extra bit, is that the circuitry to exchange such messages may be quite complex and slow to detect a flow integrity failure.

Accordingly, it is an object of the invention to provide an improved method and apparatus for checking path and flow integrity.

It is a further object of the invention to provide a simple circuit for monitoring path and flow integrity.

It is a further object of the invention to provide an improved method and apparatus for checking data, path and flow integrity.

It is a further object of the invention to provide a simple circuit for monitoring the data, path and flow integrity.

SUMMARY OF THE INVENTION

According to the invention there is provided a method of monitoring the integrity of the path and flow of digital PCM data from a source end to a receiving end which includes generating a pseudo-random sequence of bits at the source end, transmitting the pseudo-random sequence of bits together with the PCM data through a transmission path to a receiving end and applying the pseudo-random sequence of bits to a pseudo-random bit sequence checker at the receiving end.

Preferably, the method includes phase aligning the pseudo-random bit sequence generator by initializing the bit registers of said generator to a preselected set of initial states not all of which are zero.

The pseudo-random bit sequence generator may consist of a shift register having a plurality of bit registers and a feedback circuit having feedback tap points on selected ones of said bit registers.

The pseudo-random bit sequence checker may have the same number of stages of bit registers and the same feedback tap points as the pseudo-random bit sequence generator.

The feedback circuit may have tap points are at the output of the last bit register and that of the second last bit register and may take the digital signals at those points apply them to an exclusive OR circuit with the output from the exclusive OR circuit being applied to the input of the pseudo-random bit sequence checker.

A system wide clock may be provided for use in operating the pseudo-random sequence generator and the pseudo-random bit sequence checker.

According to another aspect of the invention there is provided an apparatus for monitoring the integrity of the path and flow of digital PCM data from a source end to a receiving end which includes a pseudo-random sequence generator at the source end for generating a sequence of pseudo-random bits, means for transmitting the pseudo-random sequence of bits together with the PCM data through a transmission path to a receiving end; and a pseudo-random bit sequence checker at the receiving end having an input coupled to means for transmitting so as to receive said transmitted sequence of pseudo-random bits.

According to another aspect of the invention there is provided a method of monitoring the data, path and flow integrity of digital PCM data transmitted from a source end to a receiving end which includes generating a pseudo-random sequence of bits at the source end, generating parity bits, combining the pseudo-random sequence of bits with the parity bits; transmitting the combined pseudo-random sequence of bits and parity bits together with the PCM data through a transmission path to a receiving end, separating the pseudo-random sequence of bits from the parity bits and applying the pseudo-random sequence of bits to a pseudo-random bit sequence checker at the receiving end.

This method described in this further aspect of the invention utilizes the phase aligning, pseudo-random sequence generator, pseudo-random bit sequence checker, feedback circuit and clock as described previously.

According to still another aspect of the invention there is provided an apparatus for monitoring the data, path and flow integrity of digital PCM data transmitted from a source end to a receiving end which includes a pseudo-random sequence generator at the source end for generating a sequence of pseudo-random bits, means for combining the sequence of pseudo-random bits and parity bits, means for transmitting the combined pseudo-random sequence of bits and parity bits together with the PCM data through a transmission path to a receiving end, means at the receiving end having an input coupled to means for transmitting so as to receive said transmitted combination of sequence of pseudo-random bits and parity bits, and a pseudo-random bit sequence checker at the receiving end having an input coupled to means for separating the pseudo-random sequence of bits and the parity bits so as to receive said transmitted sequence of pseudo-random bits.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 7 is a table of output values for various input values for the circuit of FIG. 2; and FIG. 8 is a table of output values for various input values for the circuit of FIG. 5.

DETAILED DESCRIPTION WITH REFERENCE TO THE DRAWINGS

Figure 1:
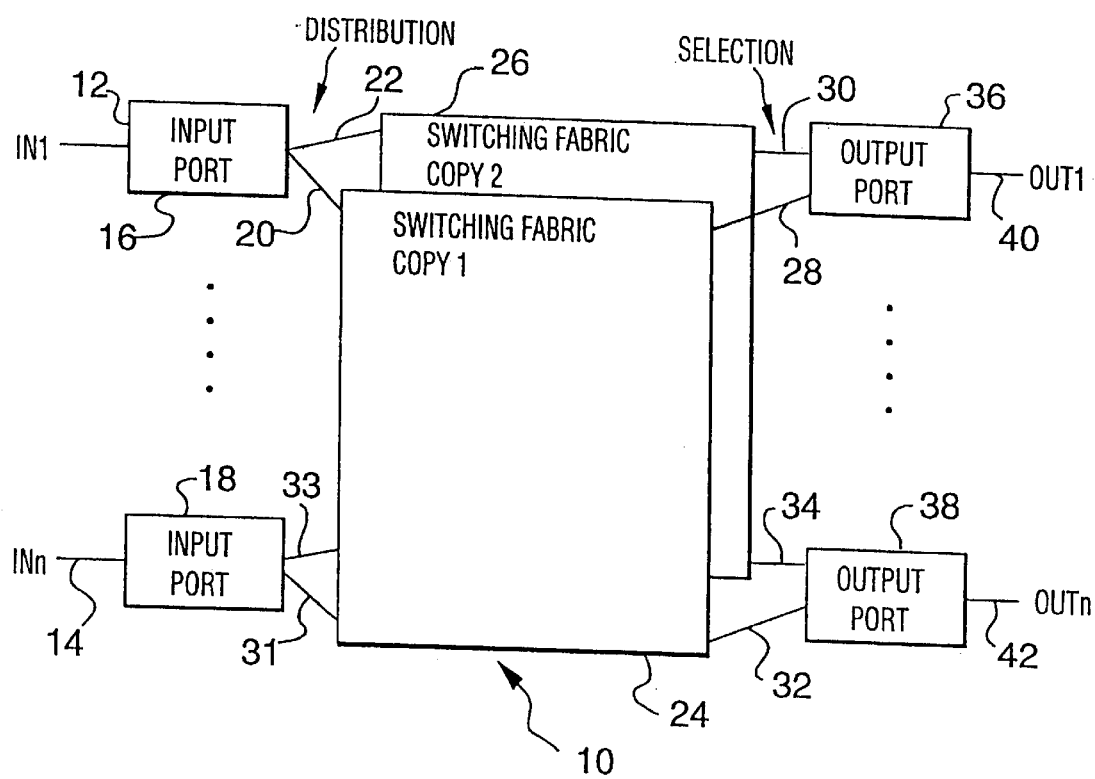
FIG. 1 is a schematic diagram showing a digital PCM switching system with two planes of switching circuitry.

Referring to FIG. 1, a digital PCM switching system has a number of input channels two of which 12 and 14 are shown coupled to respective input ports 16 and 18. The output from each input port such as port 16 is directed by output lines 20 and 22 to switching plane circuitry 24 and 26, respectively. From switching plane circuitry 24 and 26 the respective paths from lines 20 and 22 output on lines 28 and 30, respectively, to output port 36 and output line 40. Similarly, the paths from lines 31 and 33 couple through respective planes 24 and 26 along lines 32 and 34 to output port 38 and onto output line 42.

Figure 2:
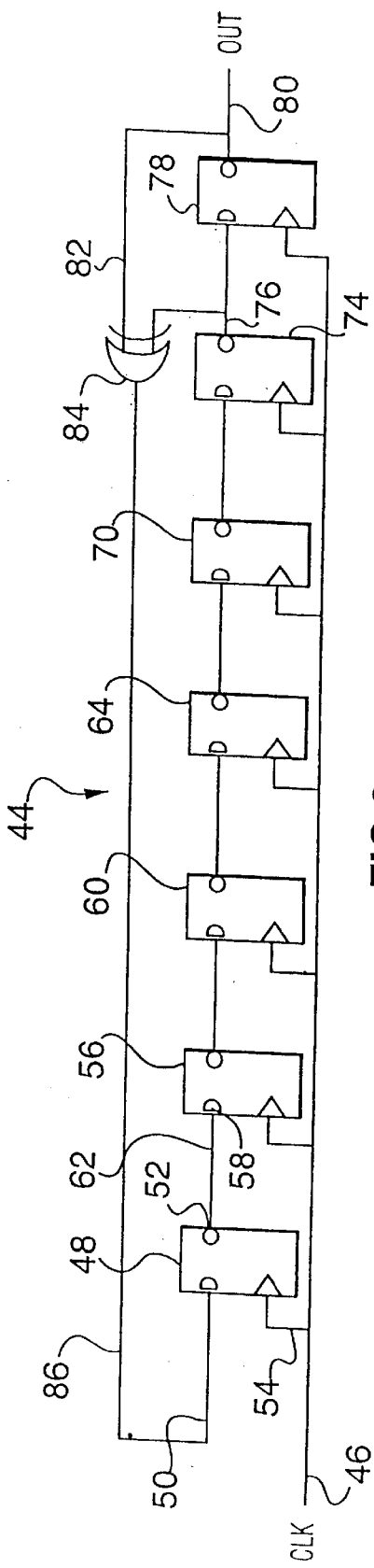
FIG. 2 is a schematic diagram of the pseudo-random sequence generator.

Referring to FIG. 2 there is shown a pseudo-random bit sequence generator 44 which consists of series of 7 bit shift registers 48, 56, 60, 64, 70, 74 and 78 all having clock inputs 54 coupled to a clock line 46 and having an output of one coupled to an input of the next. For example, an output 52 of on register 48 is coupled by line 62 to an input 58 of register 56. Line 76 which couples an output of the sixth register 74 to an input of the seventh register 78 also forms one input to NOR circuit 84. The output 80 of register 78 forms the other input to circuit 84. The output of NOR circuit 84 is taken by line 86 to the input of the first bit register 48.

Figure 3:
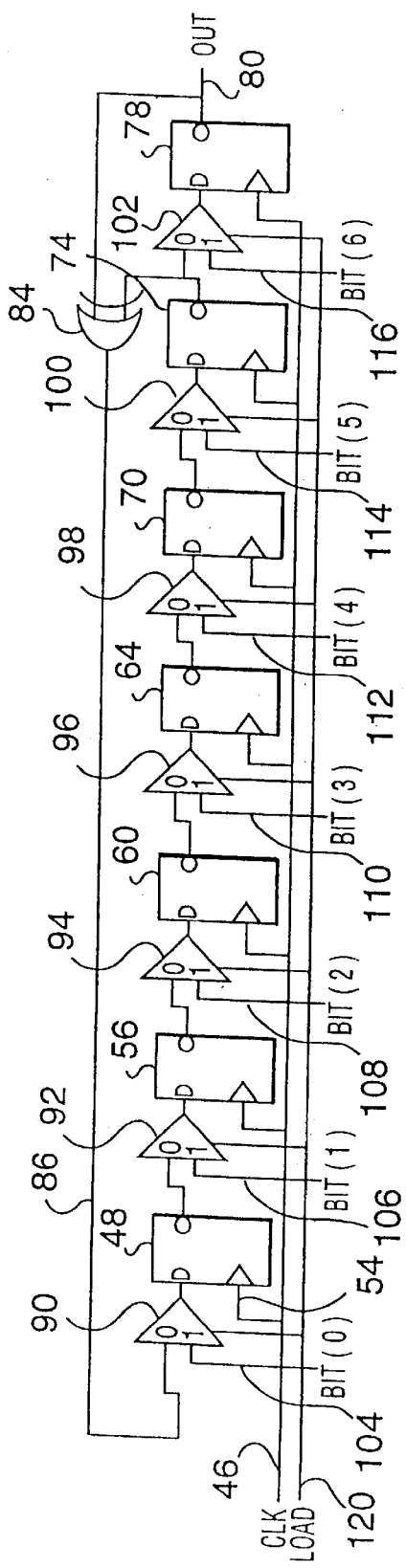
FIG. 3 is a schematic diagram of the pseudo-random sequence generator with programmable alignment.

If one represents the input of each of the 7 stages of the shift register and the output of the last stage by either a 0 or a 1, assuming that stage 7 and the output are both 1, as shown in tabular form in FIG. 3 the sequence of outputs with each successive clock pulse.

It will be appreciated that the pseudo-random bit sequence generator of FIG. 2 will generate itself as a successor state if initially in the all zeros state so that it will not operate. It has been arbitrarily assumed that the initial state is an all ones state but as long as there is at least one 1, the generator of FIG. 2 will operate. Thus, there are $2_7$-1 possible states that one can start from and $2_7$-1 output bits generated in each cycle.

If one provides a pseudo-random sequence generator to each signal source and uses a unique phase alignment for each such source then it is-possible to uniquely identify each source from the sequence of output bits. One need only initialize each source by a strobe synchronized to a common system-wide time base at an interval defined by the length of the pseudo-random sequence used, or a multiple thereof. A pseudo-random bit sequence generator 45 which can be set to an arbitrary initial state is shown in FIG. 3 in which circuits 90, 92, 94, 96, 98, 100, and 102 are gates in which the inputs marked "1" are passed if the load 120 is high and the inputs marked "0" are passed through if the load 120 is low. Selected bit values are applied to bit input lines 104, 106, 108, 110, 112, 114, and 116 and passed through to the inputs of each of the bit registers 48, 56, 60, 64, 70, 74, and 78. The load line 120 is then lowered so that gates 90 to 102, inclusive pass through the input marked "0" and the pseudo-random bit sequence generator can begin to operate. The release of the pseudo-random bit sequence generator from reset can be effected at a desired time such as, for example, when a connection is established with the destination.

Figure 4:
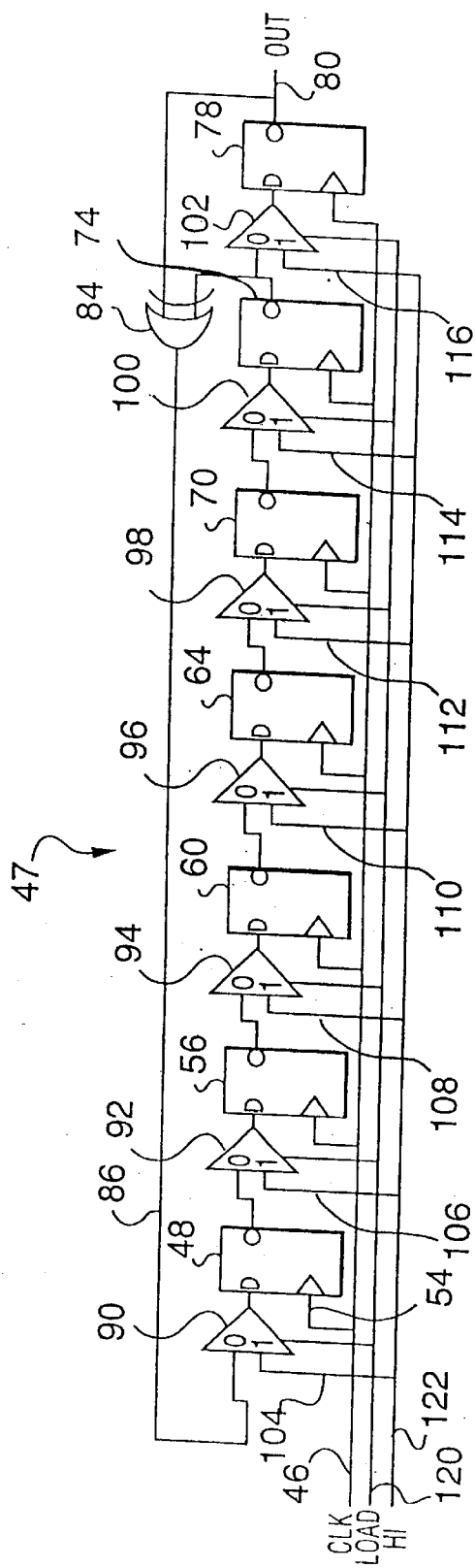
FIG. 4 is a schematic diagram of the pseudo-random sequence generator with a reset to a ones state.

A pseudo-random shift bit sequence generator 47 in which all of the bit registers are all reset to a ones state is shown in FIG. 4. Here the circuit is identical to that of FIG. 3 except that all of the separate input lines 104 to 116 inclusive are tied to a common line 122, which goes high when the circuit is being reset.

Figure 5:
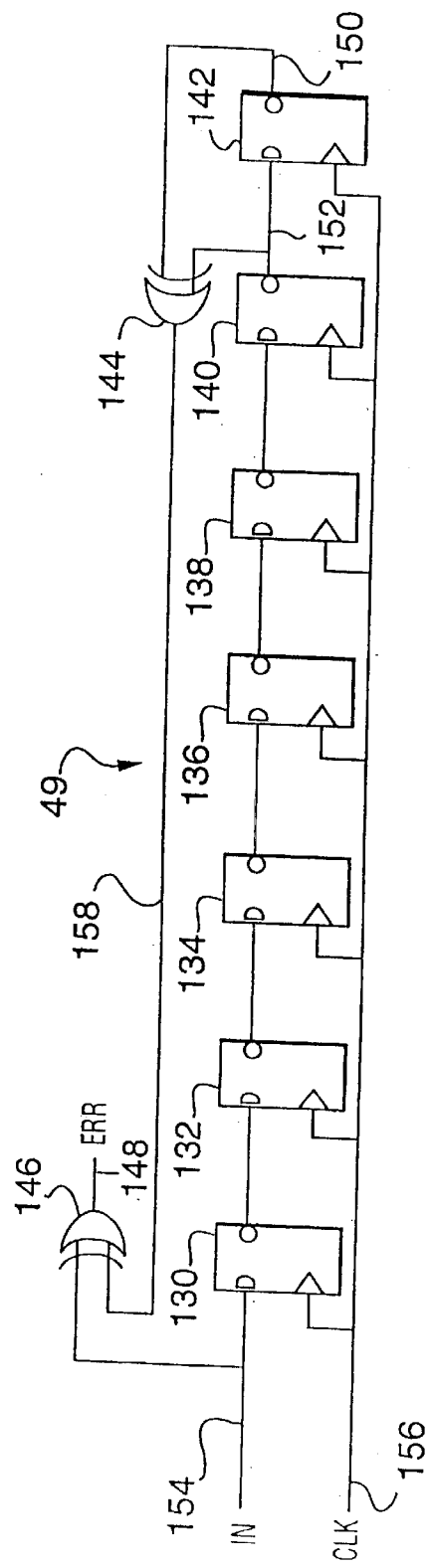
FIG. 5 is a pseudo-random bit sequence checker.

At the receiving end, one can verify the integrity of the pseudo-random bit sequence by feeding it into a shift register with identical feedback taps to those in the generator at the source which will be referred to as a descrambler. With such an arrangement one can predict the state of the next bit that should arrive at the destination. Any deviation from the predicted value indicates that a path, data or flow integrity error has occurred on the bit carrying the pseudo-random sequence. Referring to FIG. 5, the descrambler 49 consists of 7 serially connected bit registers 130, 132, 134, 136, 138, 140, and 142 each having a clock input coupled to a clock line 156. Input pulses are applied on line 154 while the signals on lines 152 from the output of the second last bit register 140 and from line 152 coupled to the output of the last bit register 142 are applied to XOR circuit 144 the output from which, on line 158, is applied to one input of another XOR circuit 146. The other input to XOR circuit 146 is obtained from the input line 154. To demonstrate that an error signal is produced only when there is a deviation from the sequence produced by the pseudo-random sequence generators 44, 45, and 47 of FIGS. 2, 3 and 4, respectively, one can take the output values from FIG. 7 and use them as inputs to FIG. 5. The result is shown in the table of FIG. 8.

Thus, as long as ERR is zero, there is no deviation of the input data from the sequence produced by a given pseudo-random bit sequence generator at the source end, the data, path and flow integrity are intact. If ERR goes to one there is an error in data, path or flow integrity.

Figure 6:
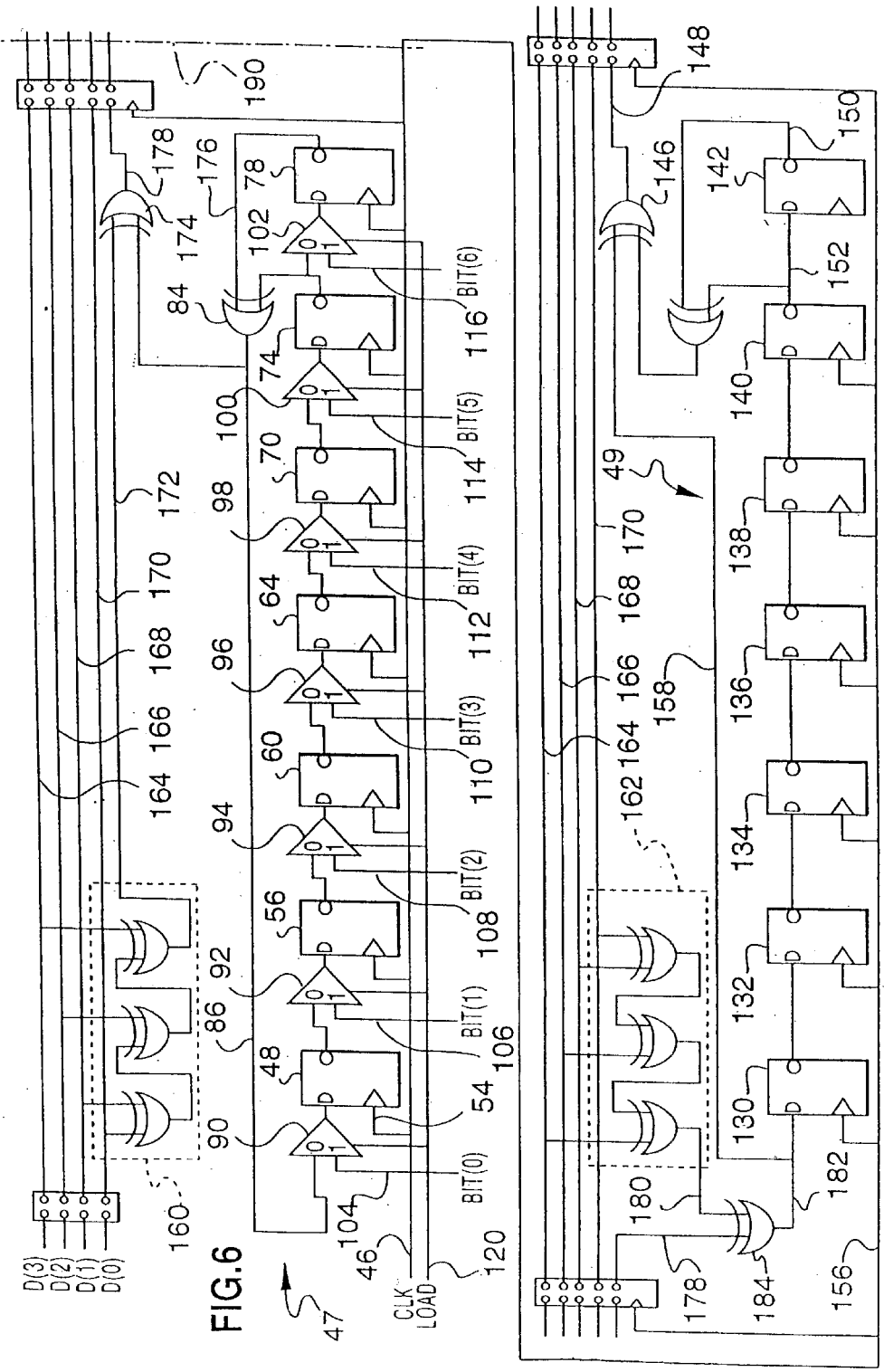
FIG. 6 is a circuit for combining parity and pseudo-random bit sequence bits for checking a 4 bit wide data path.

Referring to FIG. 6 a circuit which combines the function of the data integrity bit and the pseudo-random bit sequence generator bit (PRBS) in order to improve transmission efficiency consists of the PRBS generator 47, a parity bit generator 160 and a descrambler 49. The bits generated by the PRBS generator 47 are applied to one input of exclusive OR circuit 174 while a parity bit generated by parity bit generator 160 is applied through line 172 to the other input of exclusive OR circuit 174. The resulting combined check bit is output on line 178. It will be readily seen that if there an even number of zeros or ones on lines 164, 166, 168, and 170 then the parity bit is zero, otherwise it is one. At the receiving end the parity of the portion of the received PCM word covered by parity is calculated by parity generator 162 and applied to one input on line 180 with exclusive OR circuit 184. To the other input on line 178 is applied the combined check bit from exclusive OR circuit 174. The output of the exclusive OR circuit 184 on line 182 is the recovered PRBS bit assuming there is no error in parity. If the output of the descrambler 49 on line 148 is a one, this will reflect an error in either data, path or flow integrity.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A method of in-service monitoring of the data, path and flow integrity of digital data after transmission from a source end to a receiving end, comprising:

a) generating source end parity bits from said digital data at said source end;

b) generating a pseudo-random sequence of bits from said digital data at said source end;

c) combining logically said source end parity bits and said pseudo-random sequence of bits to produce checker bits;

d) transmitting said checker bits together with said digital data on an in-service transmission path from said source end to said receiving end;

e) generating receiving end parity bits from said digital data received at said receiving end;

f) combining logically said receiving end parity bits with said checker bits received at said receiving end to produce sequence bits; and g) applying said sequence bits to a pseudo-random bit sequence checker circuit to produce bits indicative of errors in one or more of data, path and flow integrity.

2. The method according to claim 1, wherein said digital data is digital PCM data.

3. The method according to claim 1, wherein said pseudo-random sequence of bits is generated by a pseudo-random bit sequence generator and including phase aligning said pseudo-random bit sequence generator to have a preselected set of initial states so as to allow identification of the signal source.

4. A method of in-service monitoring of the data, path and flow integrity of digital PCM data from a source end to a receiving end, comprising:

a) generating a pseudo-random sequence of bits at said source end using an N-stage pseudo-random bit sequence generator where N is an integer greater than "1";

b) applying an output of a source end parity generator and said pseudo-random sequence of bits at said source end to respective inputs of a source end logic circuit;

c) transmitting an output of said logic circuit together with said PCM data, without modifying the data using said bits, through an in-service transmission path to said receiving end;

d) applying said output from said source end logic circuit received at said receiving end to a receiving end logic circuit; and e) applying an output of said receiving end logic circuit to an N-stage pseudo-random bit sequence checker at said receiving end.

5. The method according to claim 4, including phase aligning said pseudo-random bit sequence generator by initializing the bit registers of said pseudo-random bit sequence generator to a preselected set of initial states, wherein the initial state of at least one of said bit registers is one.

6. The method according to claim 5, wherein said pseudo-random bit sequence generator is used by a series of signal sources with each said signal source having a unique initial phase alignment.

7. The method according to claim 4, wherein said pseudo-random bit sequence generator is comprised of a shift register having a plurality of stages of bit registers and a feedback circuit having feedback tap points on selected ones of said bit registers.

8. The method according to claim 7, wherein said pseudo-random bit sequence checker is comprised of a shift register having a plurality of stages of bit registers and a feedback circuit with feedback tap points on selected ones of said bit registers with the same number of stages of bit registers and the same feedback tap points as said pseudo-random bit sequence generator.

9. The method according to claim 7, wherein said feedback circuit has tap points at the output of the last bit register and at the output of the second last bit register and applies the digital signals sampled at those points to an exclusive OR circuit with the output from said exclusive OR circuit being applied to an input of said pseudo-random bit sequence checker.

10. The method according to claim 4, including a system wide clock for use in operating said pseudo-random bit sequence generator and said pseudo-random bit sequence checker.

11. The method according to claim 8, wherein the number of stages of said pseudo-random bit sequence generator and said pseudo-random bit sequence checker is seven.

12. The method according to claim 4, wherein said logic circuit and said second logic circuit are exclusive OR circuits.

13. An apparatus for in-service monitoring of the integrity of the data, path and flow of digital data after transmission from a source end to a receiving end, comprising:
   a) a pseudo-random bit sequence generator at said source end operative to produce a pseudo-random sequence of bits;
   b) a source end parity bit generator at said source end operative to produce source end parity bits from said digital data;
   c) a combiner for logically combining said pseudo-random sequence of bits and said source end parity bits to produce checker bits;
   d) a transmitter operative to transmit said checker bits together with said digital data on an inservice transmission path to said receiving end;
   e) a receiving end parity bit generator coupled to receiver digital data lines at said receiving end and operative to produce receiving end parity bits from received digital data; and
   f) a pseudo-random bit sequence checker circuit coupled to said receiving end parity bit generator and said receiver digital data lines and operative to indicate at an output whether or not there is an error in one or more of data, path and flow integrity.

14. The apparatus according to claim 13, wherein said pseudo-random bit sequence checker circuit includes a receiver logic circuit operative to combine said receiver parity bits and said checker bits and an output of said receiver logic circuit is coupled to another pseudo-random bit sequence generator.

15. The apparatus according to claim 13, wherein said digital data is digital PCM data.

16. The apparatus according to claim 13, including means for phase aligning said pseudo-random bit sequence generator and said pseudo-random bit sequence checker.

17. An apparatus for in-service monitoring of the data, path and flow integrity of digital PCM data from a source end to a receiving end, comprising:
   a) an N-stage pseudo-random bit sequence generator at said source end for generating a sequence of pseudo-random bits where N is an integer greater than "1";
   b) means for combining said sequence of pseudo-random bits with parity bits, at said source end;
   c) means for transmitting the combination of said pseudo-random sequence of bits and said parity bits, together with said PCM data along an inservice transmission path to said receiving end without modifying said PCM data;
   d) means for separating said pseudo-random sequence of bits and said parity bits, at said receiving end, having an input coupled to said means for transmitting so as to receive said combination of said sequence of pseudo-random bits and said parity bits, after transmission through said transmission path; and
   e) an N-stage pseudo-random bit sequence checker at said receiving end having an input coupled to said means for separating so as to receive said sequence of pseudo-random bits.

18. The apparatus according to claim 17, including means for phase aligning said pseudo-random bit sequence generator and said pseudo-random bit sequence checker.

19. The apparatus according to claim 17, wherein said pseudo-random bit sequence generator is comprised of a shift register having a plurality of stages of bit registers and a feedback circuit having feedback tap points on selected ones of said bit registers.

20. The apparatus according to claim 19, wherein said pseudo-random bit sequence checker is comprised of a shift register having a plurality of stages of bit registers and a feedback circuit with feedback tap points on selected ones of said bit registers with the same number of stages of bit registers and the same feedback tap points as said pseudo-random bit sequence generator.

21. The apparatus according to claim 20, wherein said feedback circuit has tap points at the output of the last bit register and at the output of the second last bit register and takes the digital signals at those points and applies them to an exclusive OR circuit with the output from said exclusive OR circuit being applied to an input of said pseudo-random bit sequence checker.

22. The apparatus according to claim 17, including a system wide clock for use in operating said pseudo-random bit sequence generator and said pseudo-random bit sequence checker.

23. The apparatus according to claim 20, wherein the number of stages of said pseudo-random bit sequence generator and said pseudo-random bit sequence checker is seven.

24. The apparatus according to claim 17, wherein:
   a) said means for combining comprises, at said source end, a first exclusive OR circuit having an input coupled to an output of a first parity generator generating parity at said source end, another input coupled to an output of said pseudo-random bit sequence generator and an output of said first exclusive OR circuit coupled to said transmitting means; and
   b) said means for separating comprises, at said receiving end, a second exclusive OR circuit having an input coupled to an output of a second parity generator generating parity at said receiving end, another input coupled to an output of said transmitting means and the output of said second exclusive OR circuit being applied to said pseudo-random bit sequence checker.

25. An apparatus for in-service monitoring of the integrity of the data, path and flow of digital PCM data from a source end to a receiving end, comprising:
   at a transmission end:
   a) a pseudo-random bit sequence generator operative to generate a pseudo-random sequence of bits;

b) a transmission parity generator coupled to PCM data lines carrying data bits to be transmitted and operative to generate source end parity bits from said PCM data;

c) a transmission logic circuit coupled to said pseudo-random bit sequence generator and said transmission parity generator operative to combine said pseudo-random sequence of bits and corresponding ones of said source end parity bits to produce checker bits;

d) a transmitter for transmitting said checker bits together with said PCM data on an in-service transmission path to said receiving end;

at a receiver end:

e) a receiver parity generator coupled to said PCM data after transmission and operative to calculate receiving end parity bits from transmitted PCM data;

f) a receiver logic circuit operative to combine said receiving end parity bits and said checker bits to output a second checker bit; and g) a receiver pseudo-random bit sequence checker circuit having an input coupled to an output of said receiver logic circuit and operative to produce output bits indicating error in data, path or flow integrity.

* * * * *

UNITED STATES PATENT AND TRADEMARK OFFICE
CERTIFICATE OF CORRECTION

PATENT NO.   : 6,490,317 B1
DATED        : December 3, 2002
INVENTOR(S)  : Charles Kevin Huscroft It is certified that error appears in the above-identified patent and that said Letters Patent is hereby corrected as shown below:

Column 1,
Line 52, delete ".".

Column 4,
Lines 42 and 43, delete "$2_7$", and insert -- $2^7$ --.
Line 47, delete "-".

Signed and Sealed this

Twentieth Day of May, 2003

JAMES E. ROGAN
*Director of the United States Patent and Trademark Office*